(12) United States Patent
Mirza et al.

(10) Patent No.: US 9,325,827 B2
(45) Date of Patent: Apr. 26, 2016

(54) METHOD AND APPARATUS FOR PROVIDING SERVICES VIA A MODULAR SMART ILLUMINATION DEVICE

(71) Applicant: Verizon Patent and Licensing Inc., Arlington, VA (US)

(72) Inventors: Momin Mirza, Santa Clara, CA (US); Nisheeth Gupta, Palo Alto, CA (US); Brian H. Whitton, Ridgefield, CT (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 90 days.

(21) Appl. No.: 14/262,359

(22) Filed: Apr. 25, 2014

(65) Prior Publication Data

US 2015/0312394 A1    Oct. 29, 2015

(51) Int. Cl.
*H04M 11/00* (2006.01)
*H04M 1/725* (2006.01)
*H05B 37/02* (2006.01)

(52) U.S. Cl.
CPC ......... *H04M 1/7253* (2013.01); *H05B 37/0227* (2013.01); *H05B 37/0236* (2013.01); *H05B 37/0272* (2013.01); *H05B 37/0281* (2013.01); *Y02B 20/48* (2013.01)

(58) Field of Classification Search
CPC ............ H04M 1/7253; H05B 37/0227; H05B 37/0272; H05B 37/0281; H05B 37/0236; H04W 88/06
USPC ............. 455/404.2, 418–422.1, 456.1, 456.3, 455/457, 436, 444, 550.1, 435.2, 435.3, 455/432.3, 440, 450, 556.2, 67.11; 370/328–332, 338, 341
See application file for complete search history.

(56) References Cited

U.S. PATENT DOCUMENTS

2010/0304730 A1* 12/2010 Huang .............. H04M 1/72572
455/419
2011/0161745 A1* 6/2011 Rahman ................ G06F 11/079
714/48

OTHER PUBLICATIONS

LIFX, "LiFX the Light Bulb, Reinvented", E26/27 Edison A21 Info Sheet, retrieved on Jun. 16, 2014 from http://store.lifx.co/pages/e26-27-edison-a21-info-sheet, 2 pages.
meethue.com, "HUE—Personal Wireless Lighting", Meet Hue Tech Specs, retrieved on Jun. 16, 2014 from http://meethue.com/en-us/inside-hue/tech-specs/, 10 pages.

* cited by examiner

*Primary Examiner* — Babar Sarwar

(57) ABSTRACT

An approach for implementing an illumination device for interfacing with other illumination devices or user devices and for receiving and providing various services. The approach includes providing an interface to an illumination device, wherein the illumination device is configured to include a plurality of modules and wherein the plurality of modules includes at least an illumination module, a networking module, and a short range wireless communication module. The approach also includes receiving an input via the interface for specifying a service associated with the illumination device, wherein the service employs at least one of the illumination module, the networking module, and the short range wireless communication module. Further, the approach includes configuring the illumination device to provide the service based on the input.

19 Claims, 13 Drawing Sheets

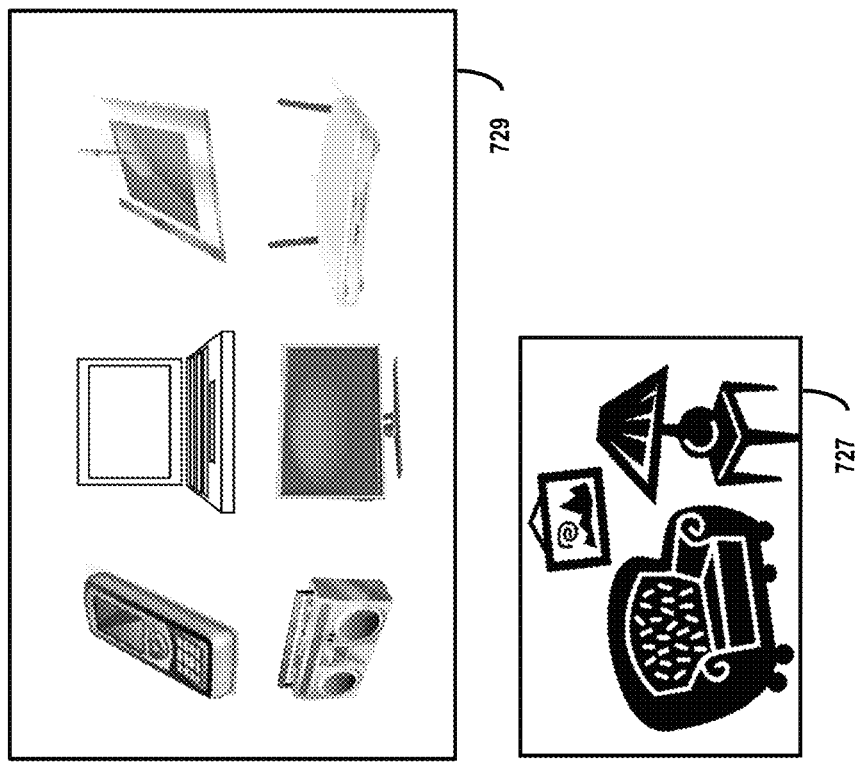
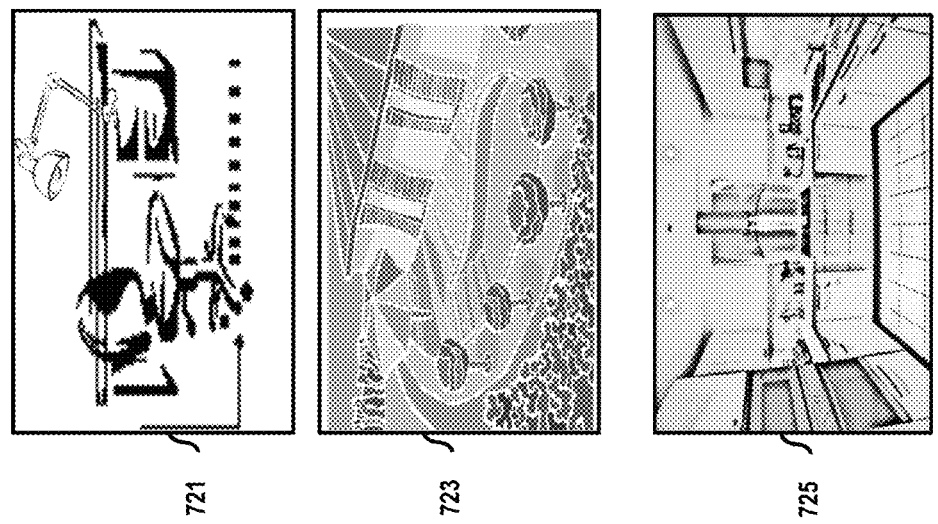
FIG. 7B

METHOD AND APPARATUS FOR PROVIDING SERVICES VIA A MODULAR SMART ILLUMINATION DEVICE

BACKGROUND INFORMATION

With technological advances in available user devices and applications, many users utilize a variety of devices with various functionalities. For example, user devices (e.g., mobile phones, tablets, laptop computers, smart illumination devices, personal projectors, television sets (TV), set-top boxes, etc.) and relevant applications may be utilized to access or provide online or offline services for entertainment, content consumption, data access, and the like. Additionally, since many of the user devices have capabilities to communicate with other user devices (e.g., local or remote), some users may utilize one user device and applications thereon to interface/communicate with and control other devices and various processes or applications on those other devices. For example, a user may utilize a mobile device at home to connect to a wireless local area network (LAN) access point (e.g., a router) for communicating with several loud speakers and stream audio files available on the mobile device for playback via the loud speakers in one or more rooms. However, it is possible that a user may collect and utilize a plurality of user devices for various purposes where the devices can require various configurations, installations, maintenance, management, etc. Moreover, placement of a collection of the user devices in a given space may be cumbersome or may create a less than desirable spatial organization.

Based on the foregoing, there is a need for a modular smart device for receiving and providing various services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 7B includes example use cases of a modular smart illumination device and various user devices to interface with, according to various embodiments;

DESCRIPTION OF THE PREFERRED EMBODIMENT

An apparatus, method and software for facilitating a modular smart illumination device for receiving and providing various services. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to an integrated modular illumination device interfacing with various user devices (e.g., a TV set, a set-top box, etc.) and services, it is contemplated that these embodiments have applicability to a variety of user devices, services, and processes where a user may wish to utilize one or more variously configured illumination devices to remotely interface with one or more user devices and services.

Figure 1:
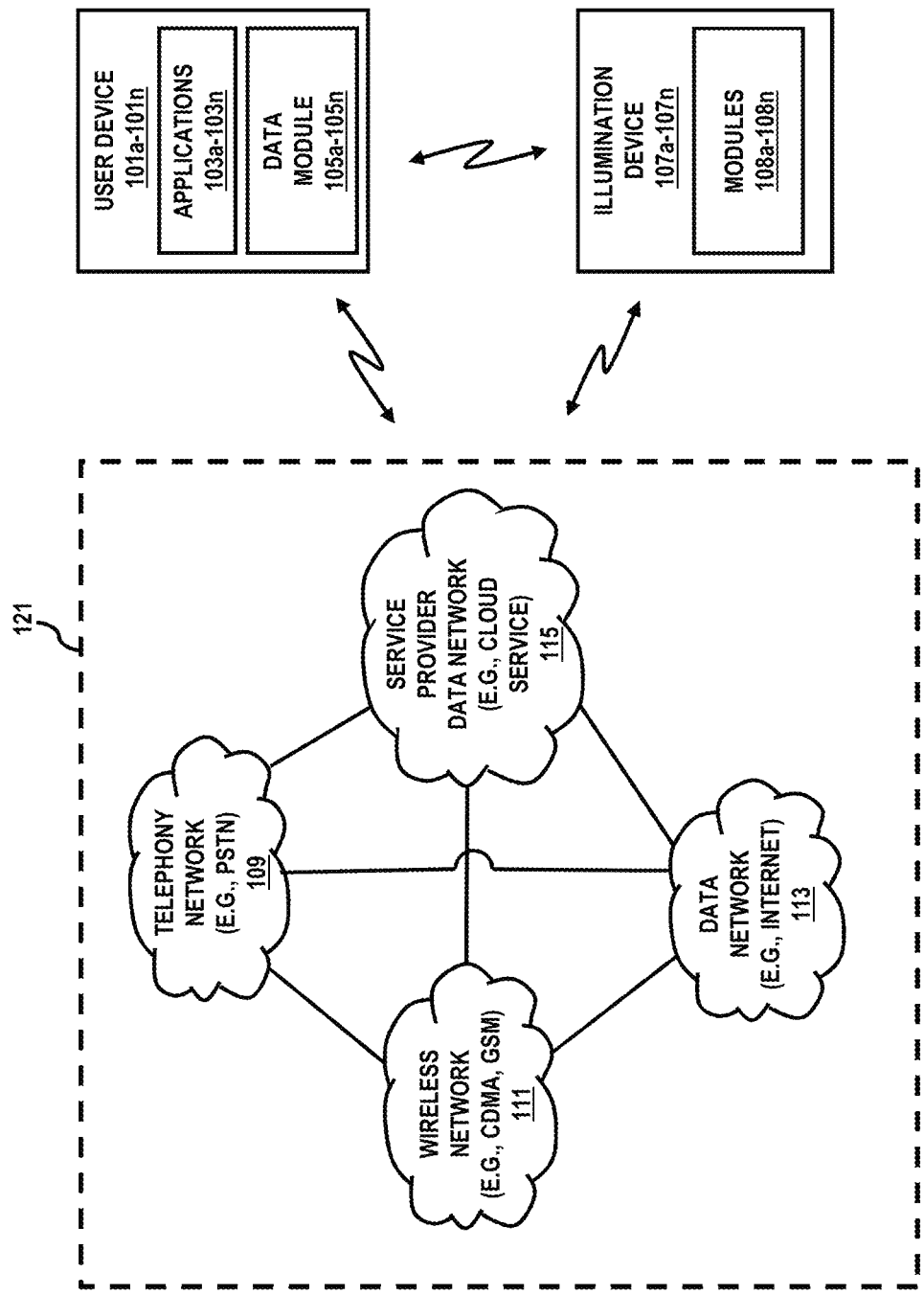
FIG. 1 is a diagram of a system capable of providing services via one or more modular smart illumination devices, according to one embodiment.

FIG. 1 is a diagram of a system for implementing a modular smart illumination device for receiving and providing various services. As previously discussed, with a proliferation of electronic user devices available to users, the users may utilize a plurality of the devices at home or at workplace to perform a variety of tasks, interface with other user devices, access a variety of local or remote services, or the like. For example, a user may use a mobile phone to interface with a TV set and control various functionalities of the TV. In another example, a user may interface with a video/audio component for controlling a consumption of a media content item, which may be streamed or replayed via that component. However, with a plethora of user devices at home or at the office, a user may have too many devices placed near each other or scattered throughout the house or the office area, which may require installation, maintenance, software/firmware updating, or the like. In various scenarios, a user may utilize a WLAN router, a media player, loud speakers, light control switches, an intercom system, a monitoring system for exterior of the house/office, a security system, motion detectors, or the like. In the example scenarios, the devices may be able to communicate with each other and/or a service provider via a WLAN or a wired network. Additionally, some of the user devices may have functionalities that may be similar to or the same as those available in other user devices. For example, a TV set may be able to receive and playback audio that is streaming from a mobile device just as the nearby loudspeakers could. In another example, a WLAN signal associated with a user device 101 or a motion sensor signals may be able to detect and indicate a movement of a user device or a user from one area to another and then transfer an audio/video content consumption to the area where the user/user-device have moved to. However, with technological advances in user devices and their functionalities, users can benefit from multifunctioning devices that can be used to receive or provide various services. Moreover, it would be beneficial to the users or service providers if they could utilize existing infrastructure at homes or at offices for enabling use of the multifunctioning devices. Common infrastructures available in most indoor and outdoor areas are electrical power outlets and sources that can be used by various electronic user devices (e.g., TVs, ovens, etc.) as well as illumination devices (e.g., light bulbs). Therefore, there is a need for a modular smart illumination device for receiving and providing various services.

To address these issues, system 100 of FIG. 1 provides the capability for a modular smart illumination device for interfacing with other illumination devices or user devices and for receiving and providing various services, according to various embodiments. As noted earlier, users and service providers may benefit from using smart user devices, e.g., mobile phones, WLAN routers, networked appliances, smart light bulbs, or the like for integrating and configuring various hardware modules and their associated firmware or software in order to provide a broader range of functionalities and services. Generally, buildings and their nearby outdoor areas provide access to power sources for use by various electronic/electrical devices as well as fixtures for receiving illumination devices (e.g., various types of light bulbs.) Therefore, it can be advantageous to have smart illumination devices that can be configured with various modules to provide a range of functionalities and options for users or service providers. Additionally, a user or service provider may control the cost of each illumination device by configuring or updating each device with those modules that may be needed at the time. Although traditional light bulbs (e.g., incandescent, compact fluorescent, etc.) do not necessarily provide variable configuration options, light emitting diodes (LEDs) can be utilized to configure an illumination device that can include an illumination module and other modules to provide various functionalities. In various embodiments, an illumination device may be configured with one or more illumination modules, communication modules, networking modules, control/command modules, motion detection modules, input/output audio modules (e.g., microphones, speakers), optical/video modules, or the like. Further, the illumination device may include a central processing unit (CPU) for executing various firmware or software associated with the various modules, wherein the CPU may manage and control the functionalities available at the illumination device.

In one embodiment, the illumination device may utilize a bi-directional or a unidirectional communication channel (e.g., wireless, via power lines, etc.) to communicate with one or more peer illumination devices, other user devices, or service providers for receiving inputs or providing outputs. For example, a communication module at the illumination device may establish a short range communication session (e.g., Bluetooth™) with a mobile device and receive an audio streaming, a command for controlling outputs of LEDs, or the like. Further, a CPU at the illumination device may process the inputs received via the communication module and/or route the inputs to various intended modules at the illumination device; for example, the audio streaming to a speaker and the command for controlling the outputs of the LEDs to an illumination module.

In one embodiment, an illumination device may utilize an audio input/output module to capture voice commands from a user and transmit the commands via a communication module to one or more remote/local user devices, peer illumination devices, or service providers.

In one embodiment, an illumination device may utilize a communication module to communicate with a user device (e.g., a TV, a mobile phone, a media player, etc.), via a local or remote communication channel, for receiving one or more commands for controlling the outputs of one or more illumination modules; for example, to change the color or intensity of available LEDs.

In one embodiment, an illumination device may receive (e.g., via a power line in proximity to a LAN router) information (e.g., network name, service set identifier (SSID), password, etc.) about an available local communication channel (e.g., WLAN), wherein the illumination device can broadcast/rebroadcast that information (e.g., as a range extender) via a WLAN communication channel, as optical signals, as audio signals, or the like.

In one embodiment, an illumination device may to receive one or more remote control commands for relaying to one or more other illumination devices or user devices.

In one embodiment, an illumination device may receive one or more inputs from one or more local/remote user devices or peer illumination devices for providing audio or visual notification alerts associated with one or more local/remote events.

In one embodiment, an illumination device may provide audio input/output interface (e.g., via Bluetooth, WLAN, etc.) to a user device (e.g., a mobile phone) so that a user may utilize the illumination device to receive audio from the user device or provide audio as input to the user device; for example, as a microphone/speaker for a phone call via a mobile phone.

In one embodiment, an illumination device may utilize a timer or usage data associated with the illumination device or one or more modules thereon and provide the usage data (e.g., via Bluetooth, power line interface, etc.) to a user device or a service provider.

In one embodiment, an illumination device may utilize a motion detection module to detect presence or absence of motion (e.g., by humans, pets, etc.) in one or more spatial areas and cause a change to one or more outputs/inputs/services associated with the spatial areas.

In one embodiment, an illumination device in a first spatial area (e.g., a kitchen) may utilize an audio/optical module to receive an input (e.g., user/device audio, video, etc.) and then utilize a communication module to output/transfer the received input to one or more peer illumination devices in one or more other spatial areas (e.g., TV room, a pool area, etc.), wherein a user may direct the transfer to a particular spatial area.

In one embodiment, an illumination device may an audio/video and motion sensor modules to receive inputs from a monitoring system (e.g., a doorbell, intercom, security system, etc.) associated with a building or an area (e.g., a house, a backyard, etc.) and then transfer the inputs as well as provide one or more notifications (e.g., audio, optical/lights, etc.) to one or more nearby spatial areas where a motion is detected.

In one embodiment, a user may utilize a user interface at a user device or via a service provider (e.g., cloud based services) to interface and control one or more functions available at one or more illumination devices associated with a spatial area of interest to the user.

In various embodiments, a plurality of illumination devices associated with a spatial area may be configured according to a master/slave devices organization, or each illumination device may be configured as an independent/master device.

For the purpose of illustration, the system 100 may include one or more user devices 101*a*-101*n* (user device 101), which may include, execute, and utilize one or more applications 103*a*-103*n* (herein after applications 103), and one or more data modules 105*a*-105*n* (also referred to as Data module 105.) Additionally, the system 100 may include one or more configurable smart illumination devices 107*a*-107*n* (herein after illumination device or illumination device(s) 107) that may include one or more modules 108*a*-108*n* (herein after modules 108.) In one embodiment, the applications 103 may include an application for interfacing with the illumination devices 107 and/or with the modules 108. In various scenarios, an application for interfacing with one or more illumination devices 108 may be a dedicated application, a widget, a generic device interface application, a web-based application, or the like. In one scenario, a user device 101 may perform additional functions for interfacing with, controlling, or managing functions of the illumination devices 107 and the modules 108 or applications/processes on those devices and modules. Similarly, an illumination device 107 may be utilized to interface with, control, or manage functions, applications, or processes at a user device 101. In one embodiment, the applications 103 may cause a rendering or presentation of a dynamic user interface (UI) including various information and options associated with processes, modules, functions, or the like at an illumination device 107. In one example, the presentation may include visual effects on the presented options. In various scenarios, the presentation may include one or more augmented or virtual reality elements, which may provide additional visual effects for a better, more effective, or user friendly experience. In one embodiment, the UI may provide various options for a user to select, highlight, or float over one or more illumination devices 107. In various embodiments, the UI elements may be determined at a user device 101 or may be determined by an illumination device 107 and communicated to and for presentation at a user device 101.

In various embodiments, a user device 101 may include a mobile phone, a tablet, a personal computer, a projector, a TV set, a set-top box, a game console, a media player/recorder, or the like. Depending on capabilities of the user devices 101, a user may utilize various methods for interfacing with an illumination device 107 or the modules 108. For example, a user device 101 may have the capabilities of a Bluetooth module, a near field communication (NFC) module, a Wi-Fi module, or the like that may be used for communicating with other user devices 101 or an illumination device 107.

In various embodiments, an illumination device 107 may be a source of illumination (e.g., a light bulb) while including one or more modules 108 that can provide additional functionalities. For instance, an illumination device 107 may include an illumination module, a communication module, a networking module, an audio/video module, a motion detection module, a power line communication (PLC) module, or the like. In one embodiment, an illumination device 107, by default, may include a CPU, one or more illumination sources (e.g., LEDs), an illumination module, an audio module (e.g., a microphone and a loud speaker), and a communication module, wherein the illumination device 107 can provide certain default functionalities. For example, a user may utilize a user device 101 (e.g., a tablet) to communicate with the illumination device 107 and control the one or more illumination sources (e.g., brighter, dimmer, turn off, turn on, etc.) as well as stream audio from the user device 101 for playback via the audio module at the illumination device 107. In one embodiment, an illumination device 107 may be configured with a plurality of modules 108 for providing a variety of functions, which may be according to specifications or preferences of a user, a manufacturer, a distributor, a seller, etc. of the illumination device 107. For example, a user may specify various configurations to have various functionalities in a plurality of illumination devices 107, which the user may wish to utilize in one or more areas (e.g., at home, at workplace, etc.) In various scenarios, a user may wish to have the different configurations for the plurality of illumination devices 107 in order to save on costs, maintenance, available resources, or the like. In one embodiment, an illumination device 107 may be configured as a master device or as a slave device for configuration in a network that includes other illumination devices 107 which may also be configured as master or slave devices. In one scenario, in a network of a plurality of illumination devices 107 at least one such device is configured as a master device. In one embodiment, a master device may be utilized to provide an interface among a plurality of slave illumination devices 107, or to provide an interface between the plurality of slave illumination devices 107 and a user device 101 or a service provider. In one embodiment, a CPU of an illumination device 107 may monitor and update the configuration of the illumination device 107, wherein the configuration information may be stored locally or remotely. In one embodiment, each illumination device 107 may be associated with a unique identifier (e.g., number, name, etc.) which may be used in communications or configurations of an illumination device 107. In various embodiments, a plurality of illumination devices 107 may be identified as being part of a group of illumination devices 107 that may be associated with a certain spatial area (e.g., a room, an area of a building, etc.), a user, a certain purpose/mode (e.g., security, entertainment, relaxation, etc.)

Furthermore, the system 100 may include a network system 121, which may include one or more networks, including a telephony network 109, a wireless network 111, a data network 113, a service provider data network 115, etc. By way of example, the networks 109, 111, 113, and 115 may be any suitable wireline and/or wireless network, which may be managed by one or more service providers. In one example, the networks 109, 111, 113, and 115 may be one or more elements in a network system 121, which may include various components and elements for providing a range of communication and network services. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109, 111, 113, and 115 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that networks 109, 111, 113, and 115 may include components and facilities to provide for signaling and/or bearer communications between the various components or facilities of system 100. In this manner, networks 109, 111, 113, and 115 may embody or include portions of a signaling system 7 (SS7) network, or other suitable infrastructure to support control and signaling functions.

By way of examples, the user devices 101 may communicate with other devices via one or more proximity-based communication channels or via one or more network service providers in the network system 121. Further, the applications 103 may include various applications for productivity, education, entertainment, social networking, web browser, communications, content sharing, multimedia applications, user interface (UI), map application, web client, or the like.

In one embodiment, a user device 101 may utilize a Data module 105 for determining/collecting data or content associated with the user device 101, one or more users of the user device 101, the applications 103, one or more content items (e.g., multimedia content), and the like. In addition, the user device 101 can execute an application 103 that is a software client for storing, processing, and/or forwarding one or more information items to other components of the system 100. In various embodiments, the Data module 105 may include various sensors for detecting and capturing various signals, information, and contents, for example, audio, video, location information, Bluetooth signals, near field communication (NFC) signals, wireless local area network (WLAN) signals, RFID signals, or the like. Further, the collected information, content, or signals may be shared, via the applications 103, with other user devices 101, or service providers in the network system 121.

It is noted that user devices 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone, set-top box, TV set, or any combination thereof. It is also contemplated that the user devices 101 can support any type of interface for supporting the presentment or exchanging of data. In addition, user devices 101 may facilitate various input means for receiving and generating information, including touch screen capability, keyboard and keypad data entry, voice-based input mechanisms and the like. Any known and future implementations of user devices 101 are applicable. In certain embodiments, user devices 101 may be configured to establish peer-to-peer communication sessions with each other using a variety of technologies, including near field communication (NFC), Bluetooth, ZigBee, infrared, etc. Also, connectivity can be provided via a wireless local area network (LAN). By way of example, a group of user devices 101 may be configured to a common LAN so that each device can be uniquely identified via any suitable network addressing scheme.

In various embodiments, the user devices 101 may communicate with each other via one or more proximity-based communication methods and protocols. For example, the communication may be via Bluetooth®, a wireless local area network (WLAN), or other available communication methods. In various examples, an illumination device 107 or a module 108 may communicate with one or more networks and service providers of the network system 121 to provide information and/or request information or services from the service providers. In various scenarios, a user device 101 may request or utilize information from the applications 103 or the Data module 105 to determine status information of an illumination device 107 that may be associated with one or more processes, applications, content items, UI presentation options, available control options, available functionalities, user profile, user preferences, user configuration, device configuration, or the like.

Figure 2:
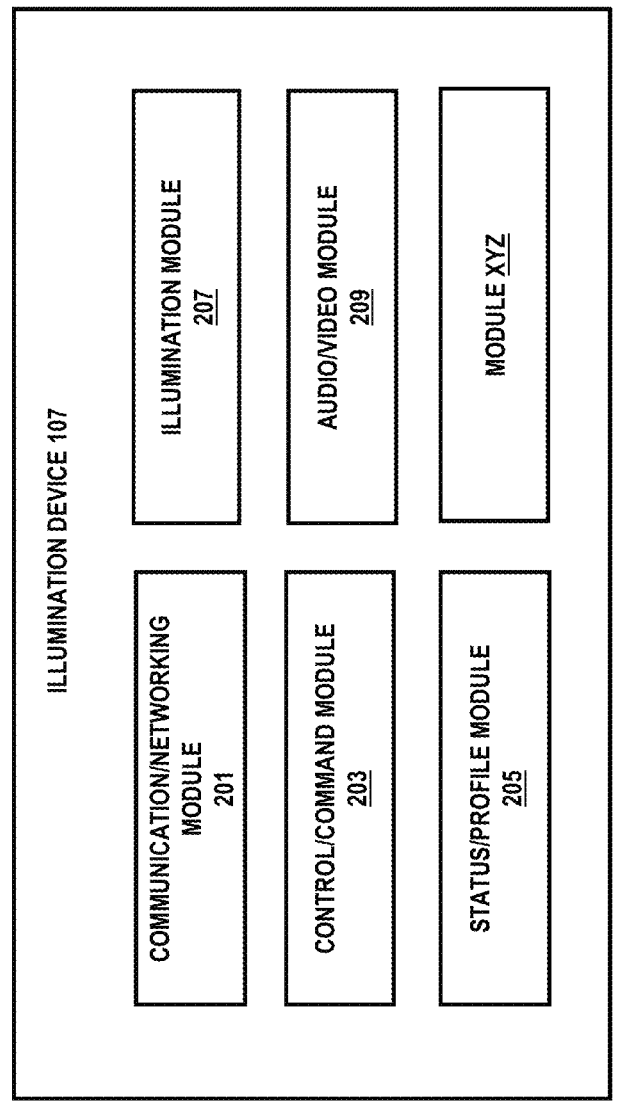
FIG. 2 is a diagram of the components of a modular smart illumination device, according to one embodiment.

FIG. 2 is a diagram of the components of an illumination device 107, according to one embodiment. By way of example, an illumination device 107 include one or more modules or components for facilitating device function and interface procedures. The modules or components may be implemented in hardware, firmware, software, or a combination thereof. It is contemplated that the functions of these modules or components may be combined into one or more modules or components or performed by other modules or components of equivalent functionality. In one embodiment, an illumination device 107 may include a communication/networking module 201, control/command module 203, a status/profile module 205, an illumination module 207, audio/video module 209, and one or more other modules XYZ. Functions, processes, or tasks at an illumination device 107 may be performed as stand-alone functions, processes, or tasks, or that they may be performed in conjunction with a user device 101 or a service provider 115.

In one embodiment, the communication/networking module 201 may be utilized to communicate with a local or remote user device 101, a service provider 115, or other illumination devices 107. In one scenario, the communication may be effectuated via one or more communication/networking modules 201 that support various communication protocols or via one or more different communication/networking modules, which may be configured into an illumination device 107. For example, a communication/networking module 201 may support communication sessions via WLAN, RFID, NFC, Bluetooth Smart, Bluetooth, Ant+, Z-Wave, ZigBee, or the like. In one embodiment, the communication/networking module 201 may include a module or provide support for cellular communications (e.g., via one or more mobile phone service providers) with a user device 101, another illumination device 107, a service provider 115, or the like.

In one embodiment, the control/command module 203 may receive a control/command request; e.g., via the communication/networking module 201, from a user device 101, a service provider 115, another illumination device 107, or the like. In various embodiments, the control/command module 203 may communicate with other modules configured into the current illumination device 107 via a dedicated communication bus and/or via the communication/networking module 201. Further, the control/command module 203 may process the control/command request, which may be a request for one or more of the modules 108 of the illumination device 107 to effectuate a command at the illumination device 107, or to communicate the received control/command request or one or more other control/command requests (e.g., based on the received control/command request) to another illumination device 107, a user device 101, a service provider 115, or the like. For example, a control/command request may be to update the status/profile of the illumination device 107 or the status/profile of one or more other illumination devices 107 in communication with the illumination device 107. In one example, a control/command request may be a request to establish a communication/networking session with a user device 101, another illumination device 107, a service provider 115, or the like. In one example, a control/command request may be a request to receive and playback audio (e.g., streaming) from a user device 101, a service provider 115, another illumination device 107, or the like.

In one embodiment, the status/profile module 205 may determine one or more information items relevant to status of one or more processes or modules at the illumination device 107. Further, a status/profile module 205 may receive and process status or profile update information from one or more other modules at the illumination device 107. In one embodiment, the status/profile module 205 may determine or generate information on a current status or a change in the current status of the illumination device 107 or its modules. In one embodiment, a status module/profile module 205 may receive and process the information for determining a current status or a change in the current status associated with one or more other illumination devices 107 (e.g., in a local mesh network.) In one embodiment, the device status/profile module 205 may include device information indicative of available modules, resources, applications, services, or the like that may be available at the device or via the device. For example, a user may utilize various applications available at a user device 101 or the user may utilize the user device 101 to access various services, resources, or the like that may be available via a local or a cloud-based network service. In one embodiment, an illumination device 107 may be associated with one or more user device 101 profiles that may indicate as to how, where, when, etc. a user device 101 or a user may access, configure, utilize, etc. an illumination device 107.

In one embodiment, the illumination module 207 may be utilized for effectuating control of the one or more illumination elements (e.g., LEDs) available at the illumination device 107. For example, the illumination module 207 may control the brightness, dimness, turning on, turning off, or the like. In various embodiments, the controlling of the one or more illumination elements may be based on a control/command request received from a user device 101, a service provider 115, another illumination device 107, or the like. In one embodiment, the controlling of the one or more illumination elements may be based on information available from the status/profile module 205. For example, one or more profiles may be associated with a certain user device 101 being present near the illumination device 107, a time of day, day of week, type of available communications/networking, any nearby detected motions (e.g., people, pets, etc.)

In one embodiment, the audio/video module 209 may be utilized for effectuating control of audio/video (e.g., loud speakers, microphones, optical lens, etc.) components that may be available at the illumination device 107. In one embodiment, the audio/video module 209 may perform one or more functions in conjunction with the communication/networking module 201, the control/command module 203, or other available modules at the illumination device 107. In one scenario, the audio/video module 209 may receive an audio/video input from a user device 101, a service provider 115, another illumination device 107, or the like, wherein the input may be played back at the illumination device 107 and/or communicated to another user device 101, another illumination device 107, or the like. For example, the audio/video module 209 may receive (e.g., via Bluetooth) a streaming audio input from a media player and playback the audio via a loudspeaker at the illumination device 107 as well as communicating that streaming audio to and for playback at other illumination devices 107 associated with the illumination device 107. In one scenario, a microphone at the at illumination device 107 may receive an audio input from a user or a user device 101 for performing one or more tasks at the illumination device 107; for example, a control request to be relayed to a nearby user device 101 and/or other illumination devices 107 associated with the illumination device 107. In one scenario, the audio/video module 209 may receive a video signal input and then playback the video along a suitable surface on the illumination device 107 and/or on a nearby surface (e.g., a wall, a desk, etc.) In one embodiment, the video signal may be transmitted to a user device 101 (e.g., a TV set, an optical projector, etc.) for presentation/playback. In one embodiment, the video or data signal outputs from an illumination device 107 may be transmitted to other illumination devices 107 and/or user devices 101 by modulating the optical outputs of one or more illumination elements (e.g., LEDs). Similarly, an illumination device 107 may utilize an optical sensor for receiving modulated optical signals (e.g., data, video, etc.) from other illumination devices 107 and/or user devices 101.

In various embodiments, an illumination device 107 may be configured with one or more other modules XYZ for providing additional functionalities at the illumination device 107, wherein the configuration may be based on specifications/preferences of a user, a manufacturer, a seller, a service provider, or the like. Generally, an illumination device 107 may be configured with a range of various modules XYZ for providing the additional functionalities, wherein a module may be generic or custom-made. Various, and not limited to, examples of the modules, elements, or components in an illumination device 107 may include one or more illumination modules, illumination elements (LEDs), communication modules, networking modules, control/command modules, motion detection modules, input/output audio modules (e.g., microphones, speakers), optical/video modules, battery/charging module, or the like. As noted, a module may perform various tasks while operating in conjunction with other modules and/or a module may perform a given task by itself, wherein each module may include or have access to (e.g., in a local memory) and execute an associated firmware or software. Additionally, each module may be interfaced with one or more appropriate sensors for providing a function at an illumination device 107. For example, the audio/video module 209 may be, at least, interfaced with a microphone and a loudspeaker; the illumination module 207 may be, at least, interfaced with one or more illumination elements and a power regulator; the motion sensor module may be, at least, interfaced with an infrared sensor, vibration sensor, etc.; the communication/networking module 201 may be, at least, interfaced with a Bluetooth transceiver (e.g., for receiving and transmitting signals), an NFC transceiver, a Wi-Fi transceiver, a PLC transceiver, and the like.

Figure 3:
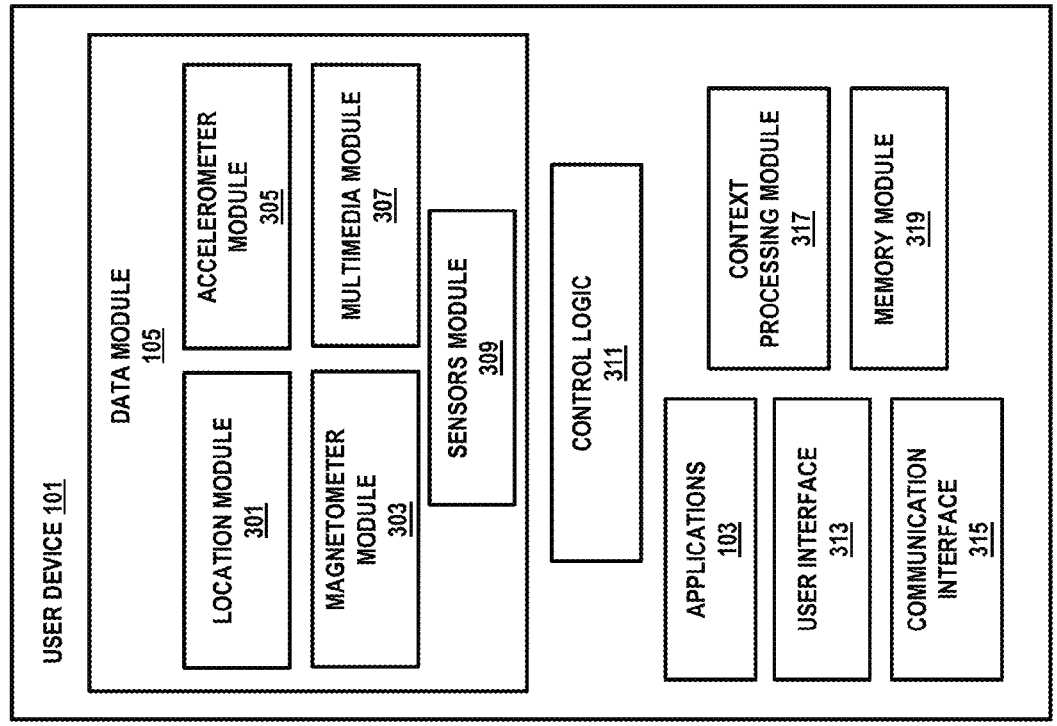
FIG. 3 is a diagram of components of a user device, according to one embodiment.

FIG. 3 is a diagram of the components of a user device, according to one embodiment. By way of example, a user device 101 includes one or more components for executing various applications, enabling various functionalities, and for communicating with other user devices 101 or with other components of the system 100. It is contemplated that the functions of these components may be combined in one or more components or performed by other components of equivalent functionality. In one embodiment, the user device 101 includes a Data module 105, which may include one or more location modules 301, magnetometer modules 303, accelerometer modules 305, multimedia module 307, and sensors module 309. Further, the user device 101 may also include control logic 311 to coordinate the use of other components of the user device 101, a user interface 313, a communication interface 315, a context processing module 317, and a memory module 319. The applications 103 may execute on the control logic 311 utilizing the components of the user device 101.

The location module 301 can determine a user's location, for example, via location of a user device 101. The user's location can be determined by a triangulation system such as GPS, assisted GPS (A-GPS), Cell of Origin, or other location extrapolation technologies. Standard GPS and A-GPS systems can use satellites to pinpoint the location of a user device 101. A Cell of Origin system can be used to determine the cellular tower that a cellular user device 101 is synchronized with. This information provides a coarse location of the user device 101 because the cellular tower can have a unique cellular identifier (cell-ID) that can be geographically mapped. The location module 301 may also utilize multiple technologies to detect the location of the user device 101. Location coordinates (e.g., GPS coordinates) can give finer detail as to the location of the user device 101 when media is captured. In one embodiment, GPS coordinates are stored as context information in the memory module 319 and are available to the context processing module 317, the Data module 105, and/or to other entities of the system 100 (e.g., via the communication interface 315.) Moreover, in certain embodiments, the GPS coordinates can include an altitude to provide a height. In other embodiments, the altitude can be determined using another type of altimeter. In certain embodiments, the location module 301 can be a means for determining a location of the user device 101, an image, or used to associate an object in view with a location.

The magnetometer module 303 can be used in finding horizontal orientation of the user device 101. A magnetometer is an instrument that can measure the strength and/or direction of a magnetic field. Using the same approach as a compass, the magnetometer is capable of determining the direction of a user device 101 using the magnetic field of the Earth. The front of a media capture device (e.g., a camera) can be marked as a reference point in determining direction. Thus, if the magnetic field points north compared to the reference point, then the angle of the user device 101 from the magnetic field is known. Simple calculations can be made to determine the direction of the user device 101. In one embodiment, horizontal directional data obtained from a magnetometer can be stored in memory module 319, made available to other modules and/or applications 103 of the user device 101, and/or transmitted via the communication interface 315 to one or more entities of the system 100.

The accelerometer module 305 can be used to determine vertical orientation of the user device 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a user device 101 is stationary, the accelerometer module 305 can determine the angle the user device 101 is pointed as compared to Earth's gravity. In certain embodiments, the magnetometer module 303 and accelerometer module 305 can be means for ascertaining a perspective of a user. This perspective information may be stored in the memory module 319, made available to other modules and/or applications 103 of the user device 101, and/or sent to one or more entities of the system 100.

In one embodiment, the multimedia module 307 may be utilized to generate, receive, or consume, etc. various content/media items, for example, images, video, audio, text, and the like. In various embodiments, the media items may be shared with the applications 103, which in turn may share the media with one or more components of the system 100. In various embodiments, the multimedia module 307 may interface with various sensors; for example, a camera, a microphone, etc., to determine additional contextual information associated with a media item.

In various embodiments, the sensors module 309 can process sensor data from various sensors (e.g., microphone, optical, Bluetooth, NFC, GPS, accelerometer, gyroscope, thermometer, etc.) to determine environmental (e.g., atmospheric) conditions surrounding the user device 101, user mood, location information, and various other information from a range sensors that may be available on one or more devices. For example, the sensors module 309 may detect conditions including humidity, temperature, geo-location, biometric data of the user, etc. Once again, this information can be stored in the memory module 319 and sent to the context processing module 317 and/or to other entities of the system 100. In certain embodiments, information collected from the Data module 105 can be retrieved by the control logic 311 and stored at the memory module 319, made available to other modules and/or applications 103 of the user device 101, and/or sent to one or more entities of the system 100.

The user interface 313 can include various methods for a user to interface with applications, modules, sensors, and the like at a user device 101. For example, the user interface 313 can have outputs including a visual component (e.g., a screen), an audio component, a physical component (e.g., vibrations), and other methods of communication. User inputs can include a touch-screen interface, a scroll-and-click interface, a button interface, a microphone, etc. An input may be via one or more methods such as voice input, textual input, typed input, typed touch-screen input, other touch-enabled input, etc.

In one embodiment, the communication interface 315 can be used to communicate with one or more entities of the system 100, for example, to submit a request for and receive a content stream from various content stream providers. In various embodiments, the communication interface 315 may facilitate communications via one or more wireless communication channels and protocols, for example, WLAN, RFID, NFC, Bluetooth Smart, Bluetooth, Ant+, Z-Wave, ZigBee, or the like, wherein the communication channels may be established via one or more sensors, transceivers, transmitters, receivers, wireless charging interface, or the like. Certain communications can be via methods such as an internet protocol, messaging (e.g., SMS, multimedia messaging service (MMS), etc.), or any other communication method (e.g., via the network system 121). In some examples, the user device 101 can send context information associated with the user device 101 to other user devices 101 and/or to other entities of the system 100.

The context processing module 317 may be executing on the control logic 311 for determining context information from the Data module 105 or the applications 103. This information may be transmitted, via the communication interface 315, to one or more user devices 101, one or more illumination devices 107, and/or to other entities of the system 100. The context processing module 317 may additionally be utilized as a means for determining information related to the user, an instance of data, a value, a process, a content item, an object, a subject, an application 103 being executed, and the like. In certain embodiments, the context processing module 317 can infer higher level context information from the context data such as activity at a user device 101, user information, etc. In one example, contextual information associated with one or more media items, consumption of a media item, or the like may be determined and shared with one or more user devices 101.

Figure 4:
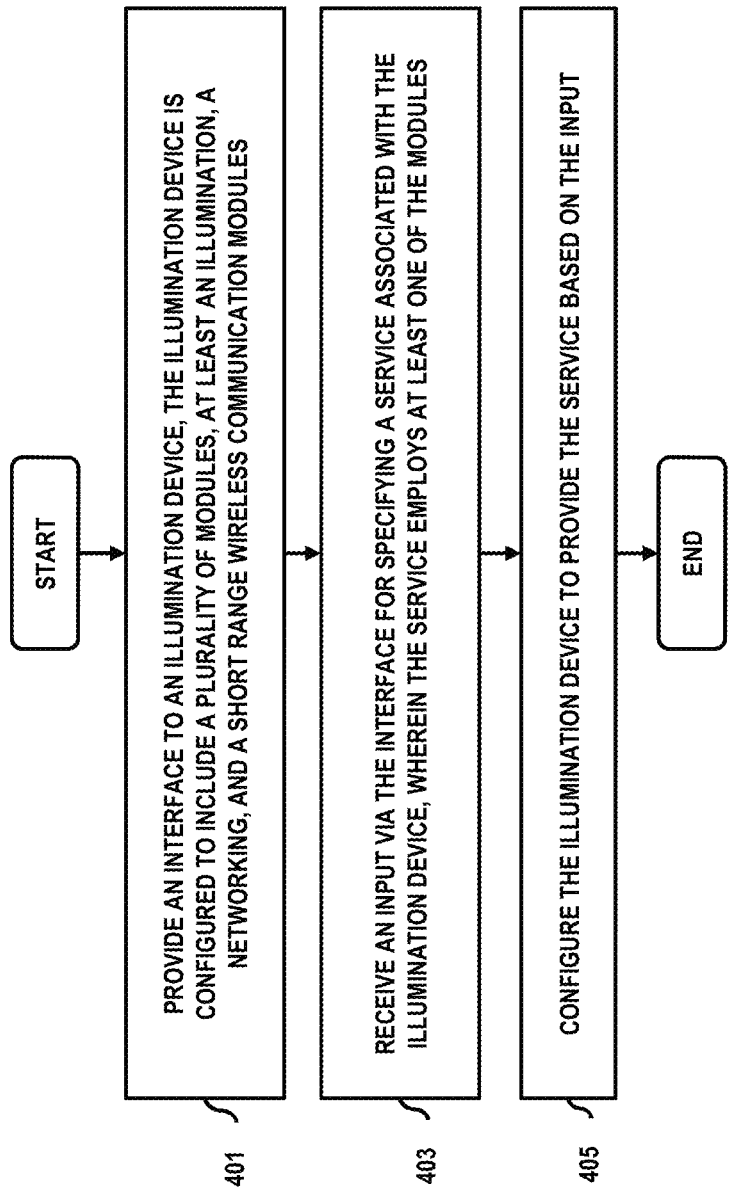
FIGS. 4 through 6 are flowcharts of processes for providing services via one or more modular smart illumination devices, according to various embodiments.
Figure 5:
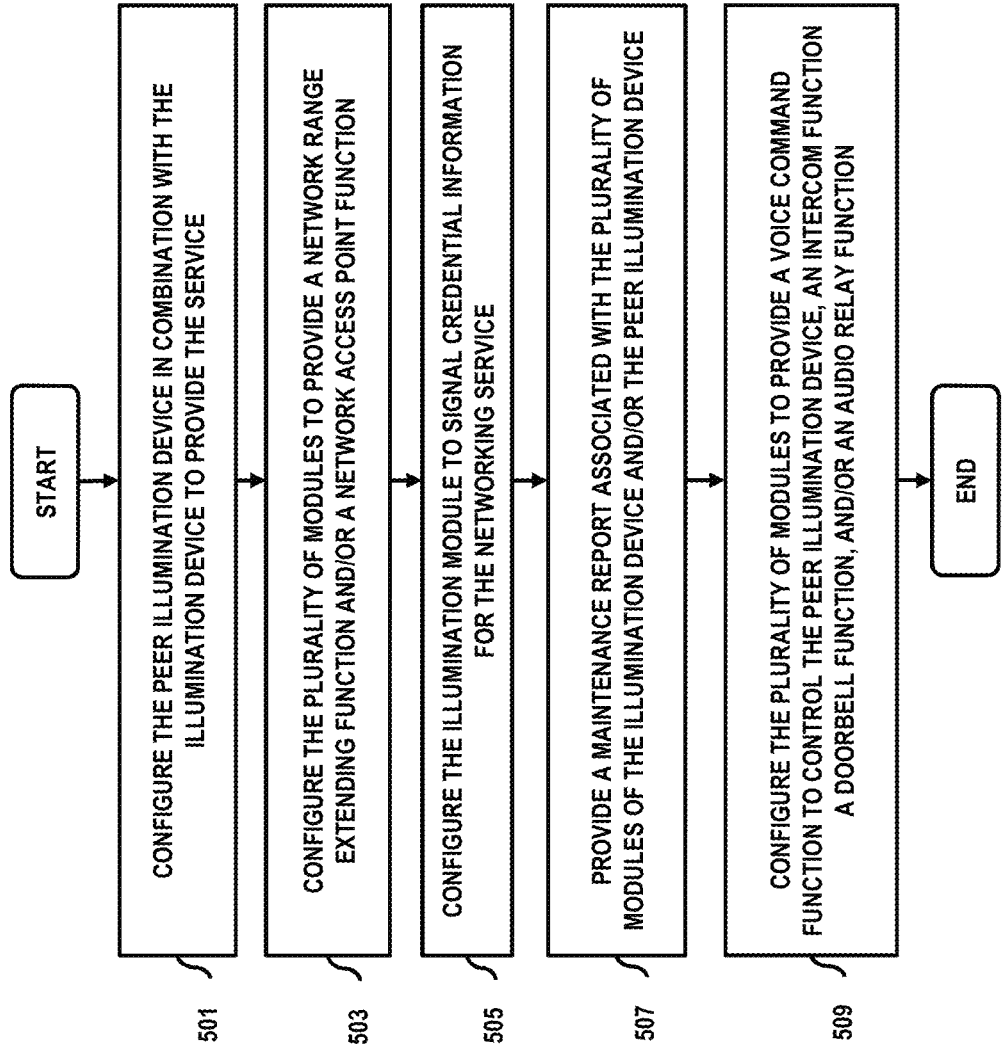
Figure 6:
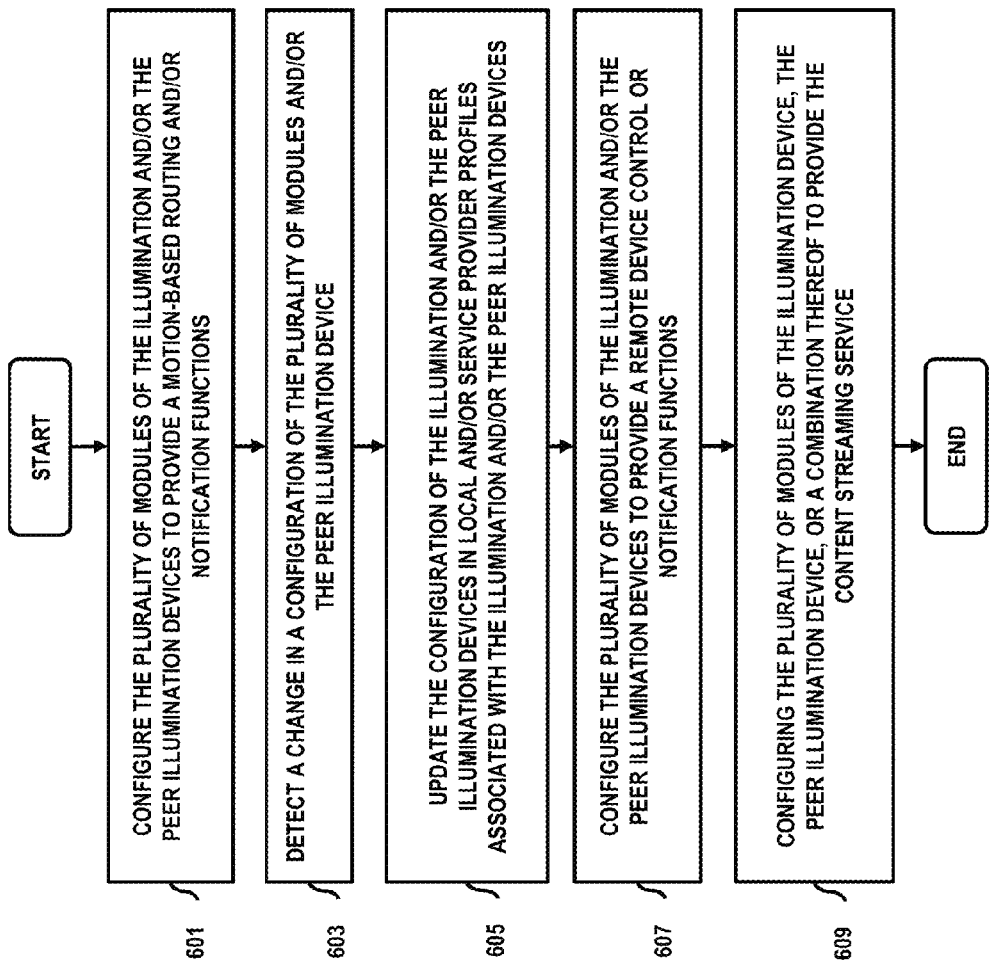

FIGS. 4 through 6 are flowcharts of processes for providing services via one or more modular smart illumination devices, according to various embodiments. It is noted that the steps of processes 400, 500, and 600 may be performed in any suitable order and by any of the components of the system 100, as well as combined or separated in any suitable manner. Further, for clarity in discussing the processes 400, 500, and 600, the illumination device is referred to as completing various steps of said processes, which may be performed in any suitable order, wherein one or more of the steps may be optional.

As shown in FIG. 4, the process 400 may begin at step 401 where the illumination device may provide an interface to an illumination device, wherein the illumination device is configured to include a plurality of modules and wherein the plurality of modules includes at least an illumination module, a networking module, and a short range wireless communication module. In various scenarios, a user, a manufacturer, a service provider, or the like may configure an illumination device 107 with various modules 108, elements, components, firmware, software, etc. for providing various functionalities or services. Examples of the modules, elements, or components in an illumination device 107 may include one or more illumination modules, illumination elements, communication modules, CPUs, networking modules, control/command modules, motion detection modules, input/output audio modules (e.g., microphones, speakers), optical/video modules, battery/charging modules, power regulator modules, timer modules, maintenance modules, or the like. In one embodiment, the illumination device 107 may provide an interface via the one or more modules 108, CPUs, or software programs for interaction with another illumination device 107, a user device 101, or a service provider 115, or the like. In one example, a user may utilize a user device 101 to establish communication with an illumination device for effectuating a change at the illumination device, providing a service, receiving a service, or the like. In various embodiments, an illumination device 107 may be configured with generic or custom-made module, components, elements, or the like. In one embodiment, an illumination device 107 may include a CPU for managing functions or interface among the modules 108, or the interface between the illumination device 107 and an external entity (e.g., a user device, a service provider, etc.)

In step 403, the illumination device may receive an input via the interface for specifying a service associated with the illumination device, wherein the service employs at least one of the illumination module, the networking module, and the short range wireless communication module. In various embodiments, an illumination device 107 may communicate/interface with a user device 101 or a service provider 115 and receive a control/command request, which may indicate a request for one or more actions at the illumination device 107. In one scenario, the message may be processed by a CPU or the control/command module 203, or the message may be communicated to one or more modules 108 for processing and effectuating the request/actions. For example, a user device 101 may communicate a message to an illumination device 107 indicating a request for turning on the illumination elements at the illumination device 107, wherein a command is generated or communicated to the illumination module 207 of the illumination device 107 to turn on the illumination elements. In one embodiment, a user device 101 or a service provider may communicate a message to an illumination device 107 via a remote or local networking channel (e.g., LAN, WLAN, etc.) and a networking module available at the illumination device 107. In one embodiment, a control/command request may be communicated to an illumination device 107 via a short range wireless channel (e.g., Bluetooth, NFC, etc.) and a wireless communication module at the illumination device 107, which can support such a communication (e.g., via a Bluetooth transceiver module.)

In step 405, the illumination device may configure the illumination device to provide the service based on the input. In one embodiment, a requested task or action may be completed by a specific module 108 at the illumination device 107. For example, a request for receiving an audio streaming from a user device 101 and playback at the illumination device 107 may be accomplished by the audio/video module 209, wherein that module may directly receive, process, or playback the streaming audio. In one embodiment, a requested service/task may be performed by a plurality of modules 108 at the illumination device 107. For example, the streaming audio from the user device 101 may be received via the communication/networking module 201, then processed and played back via the audio/video module 209 and a loudspeaker at the illumination device 107. In various embodiments, the module 108 may include one or more integrated modules for providing various functionalities at an illumination device 107. In one embodiment, a requested service may be performed by a plurality of illumination devices 107, which may operate as members of group associated with one or more spatial areas. In the above example of streaming audio, the audio may be played back via a plurality of illumination devices 107 available in a building or at an exterior area, which may function in a LAN (e.g., a mesh network.)

Referring to FIG. 5, the process 500 may begin at step 501, wherein the illumination device is associated with a peer illumination device, the illumination device may configure the peer illumination device in combination with the illumination device to provide the service. In one embodiment, an illumination device 107 at a given spatial area (e.g., in a living room area of a house) may be associated with a plurality of other/peer illumination devices 107 (e.g., in a kitchen, bedrooms, dining room, etc. of the house), wherein the illumination device 107 and its peer illumination devices 107 may form and operate in a LAN. In one embodiment, an illumination device 107 may directly communicate with a plurality of peer illumination devices 107 to determine and configure the modules and capabilities available at the illumination device 107 and that of the peer illumination devices 107 so that one or more services may be provided via the illumination device 107 and its peer illumination devices 107. For example, a first illumination device 107 may scan a given spatial area to determine an availability of peer illumination devices 107, wherein if there are any peer illumination devices, the first illumination device may configure all available illumination devices into a network of illumination devices for providing a variety of services that may be based on the configurations of the available illumination devices. In various embodiments, each illumination device associated with a network of illumination devices at a spatial area may be configured with the same or with different modules and functionalities.

In step 503, wherein the service is a networking service, the illumination device may configure the plurality of modules of the illumination device to provide a network range extending function, a network access point function, or a combination thereof. In one embodiment, an illumination device 107 may include a networking module for communicating with a LAN, WLAN, or the like access point (e.g., a network router, a user device, an illumination device, etc.), which may be connected to at least one network channel. In one embodiment, a first illumination device may function as a network access point for its peer illumination devices 107 or user devices 101 (e.g., nearby), wherein the first illumination device 107 may determine and transmit (e.g., unicast, broadcast, multicast, etc.) the network information (e.g., SSID, password, or the like) so that the peer illumination devices 107 or the user devices 101 may utilize the network information and access the network via the first illumination device 107. In one embodiment, an illumination device 107 may function as a network range extender by receiving the network information (e.g., from a peer illumination device 107, a user device 101, a service provider, etc.) and rebroadcasting that network information, which may be received and utilized by its peer illumination devices 107 or user devices 101. For example, a first illumination device located at one end of a building may receive information associated with a WLAN from a network router that may be located farther at the other end of the building. Further, the first illumination device may rebroadcast that network information so that peer illumination devices or user devices close to the first illumination device can receive the network information. In one scenario, the first illumination device may receive the network information, for rebroadcast, from a peer illumination device or a user device; for example, a rebroadcast of an original broadcast, or a rebroadcast of a rebroadcast.

In step 505, the illumination device may configure the illumination module to signal credential information for the networking service. In various embodiments, one or more illumination devices may be configured to communicate the network information that may be used by the peer illumination devices or user devices for accessing the networking service. In various examples, the information may be communicated to the peer illumination devices or user devices via a short range wireless communication channel (e.g., Bluetooth, NFC, etc.), or via a LAN networking communication channel (e.g., Wi-Fi), or the like. In one embodiment, the information may be signaled via modulated optical signals (e.g., light from LEDs) by a transmitting illumination device, wherein a receiving device may utilize one or more optical sensors (e.g., a camera lens) to detect the modulated optical signals and decode the signals, for example, via the audio/video module 209 (e.g., including a digital signal processor (DSP)). In various scenarios, a user or a service provider associated with the networking service may determine how, when, where, or to which devices the credential information may be provided to. In one example, the credential information may be provided only to known or authenticated devices.

In step 507, wherein at least the illumination device includes a timing module, the illumination device may provide a maintenance report associated with the plurality of modules of the illumination device, the peer illumination device, or a combination thereof. In one embodiment, the timing module may be a stand-alone module, which may interface with various modules 108, components, or elements at the illumination device for determining their performance or utilization information. In one example, the information may be analyzed by one or more modules at an illumination device for providing a maintenance report on the modules 108, components, or elements at the illumination device, wherein the report may indicate a maintenance schedule or use information associated with the modules 108, components, or elements. In one embodiment, the report, or the performance or utilization information may be communicated to a user device 101 or one or more service providers 115 for tracking or maintenance scheduling. In one scenario, the report may indicate remaining future use time or instance associated with each of the modules 108, components, or elements. In one scenario, each module 108 may provide information about its performance or utilization information, which can be communicated to a user device or a service provider. In one scenario, the maintenance module may provide to a user device or a service provider a notification when a module 108, a component, or an element at an illumination device needs maintenance. In one embodiment, a first illumination device may determine and provide one or more maintenance reports that include performance or utilization information associated with one or more peer illumination devices. For example, the first device periodically or on demand may query the peer illumination devices for their performance or utilization information, which can be then included in one or more reports provided to a user device or a service provider.

In step 509, wherein the plurality of modules further includes at least a microphone module and a speaker module, and wherein the service is an audio-initiated service, the illumination device may configure the plurality of modules of the illumination device to provide a voice command function to control the peer illumination device, an intercom function, a doorbell function, an audio relay function, or a combination thereof. In one embodiment, an illumination device may receive a control/command request as an audio input via a microphone module (e.g., audio/video module 209) at the illumination device, wherein the request is to control or effectuate a function at one or more peer illumination devices or at one or more user devices. In one example, the request may be to turn-on several peer illumination devices at a given spatial area associated with the illumination device, a user device, a user, or the like. In one example, the request may be to transfer the functionality of an intercom system at a given spatial area to illumination devices associated with the spatial area. For instance, a user located in a kitchen area of a house may wish to communicate with another user located in a garage of the house via illumination devices located in the respective kitchen and garage areas. In one example, the request may be to transfer a doorbell to one or more illumination devices located in one or more spatial areas associated with a user. In one example, the request may be for an illumination device to relay an audio message to one or more peer illumination devices, user devices, an intercom system, a monitoring device, or the like. In one example, the request may be to process the audio input and convert the audio into a data for streaming to one or more user devices, peer illumination devices, or the like.

As shown in FIG. 6, the process 600 may begin at step 601 wherein the plurality of modules further includes at least a motion sensor module, and wherein the service is a motion-based service, the illumination device may configure the plurality of modules of the illumination device, the peer illumination device, or a combination thereof to provide a motion-based routing function, a motion-based notification function, or a combination thereof. In one embodiment, if a motion sensor module at an illumination device determines a presence of a user in a given spatial area, then one or more modules at the illumination device may route or request for a transfer of a service from a user device, a peer illumination device, or a service provider, to the illumination device in that spatial area. For example, if an illumination device detects a user movement in a garage area of a house, then the illumination device may route or request to route a doorbell function/event to that illumination device so that the user may be aware if there is a doorbell function (e.g., someone at the front door ringing the doorbell). In one embodiment, an illumination device may determine a user movement in a spatial area that should be avoided when routing or transferring a function or notification to one or more illumination devices associated with that spatial area. For instance, if an illumination device detects a user movement in a home-office room or a baby's room, then illumination devices in those rooms should not receive a routing of an audio playback request.

In step 603, wherein the service is a networking service, the illumination device may detect a change in a configuration of the plurality of modules of the illumination device, the peer illumination device, or a combination thereof. In one embodiment, in a network of illumination devices, an illumination device may detect a change in modular configuration or functionalities of a plurality of peer illumination devices. For example, an illumination device may detect that a new illumination device (e.g., a new device ID) has been added to an existing illumination device network, or that an illumination device formerly part of the illumination device network is no longer present/registering, or that a modular configuration or functionalities of an illumination device has changed, which may be due to a new or missing module, firmware, software, etc. In one embodiment, an illumination device may determine that an illumination device network may be able to provide one or more new services based on a combination of one or more configuration changes at one or more illumination devices in the network. For example, with the addition of a motion sensor module to one illumination device and an addition of an audio module to another illumination device in a same spatial area, the illumination device network can now route a motion-based audio service to that illumination device with the audio module.

In step 605, the illumination device may update the configuration of the illumination device, the peer illumination device, or a combination thereof in a local profile, a service provider profile, or a combination thereof associated with the illumination device, the peer illumination device, or a combination thereof to provide the service. In various scenarios, one or more illumination devices in an illumination device network may determine configuration changes to an illumination device in the network or changes to the network itself, and then update one or more local or remote configuration profiles at a user device, a service provider, or the like. In one embodiment, an update to a configuration profile may indicate one or more changes to one or more services based on one or more changes in the configurations of the illumination devices in a network. In one scenario, each illumination device may update the local or remote profiles based on changes to its own configuration.

In step 607, wherein the service is a remote device service, the illumination device may configure the plurality of modules of the illumination device, the peer illumination device, or a combination thereof to provide a remote device control function, a remote device notification function, or a combination thereof. In one embodiment, one or more illumination devices may be configured to provide remote control functions for controlling one or more user devices. For example, an illumination device may receive from a user, a user device, or a service provider a control/command request for controlling a function at a TV set, a refrigerator, a baking oven, at another illumination device, or the like. For example, an illumination device may receive a request to turn off the TV set, change the current settings at the refrigerator or the baking oven. In one embodiment, a user device may control a function at an illumination device. For example, a TV set may communicate a control/command request for controlling the illumination elements at one or more illumination devices. In one embodiment, a user device may communicate a control/command request for providing a notification via an illumination device. For example, a TV set may request for an illumination device to provide an optical or an audio notification to a user, near the illumination device, indicative that a certain TV show is about to begin showing. In another example, a baking oven may request for an illumination device to provide an optical or an audio notification to a user, near the illumination device, indicative of a certain temperature or a time period.

In step 609, wherein the service is a content streaming service, the illumination device may configure the plurality of modules of the illumination device, the peer illumination device, or a combination thereof to provide the content streaming service. In one embodiment, a user device may communicate a control/command request to one or more illumination devices to receive a streaming of a content item from one or more user devices, one or more service providers, etc. for playback at the illumination devices and/or at one or more user devices. In one embodiment, a user may communicate a control/command request for an illumination device to retrieve and stream a content item via an illumination device to one or more user devices, peer illumination devices, or the like. In various embodiments, one or more modules 108 may be utilized to communicate with and receive a content item from a service provider, a content provider, a media device, or the like, which may be streamed via one or more modules at one or more illumination devices.

Figure 7A:
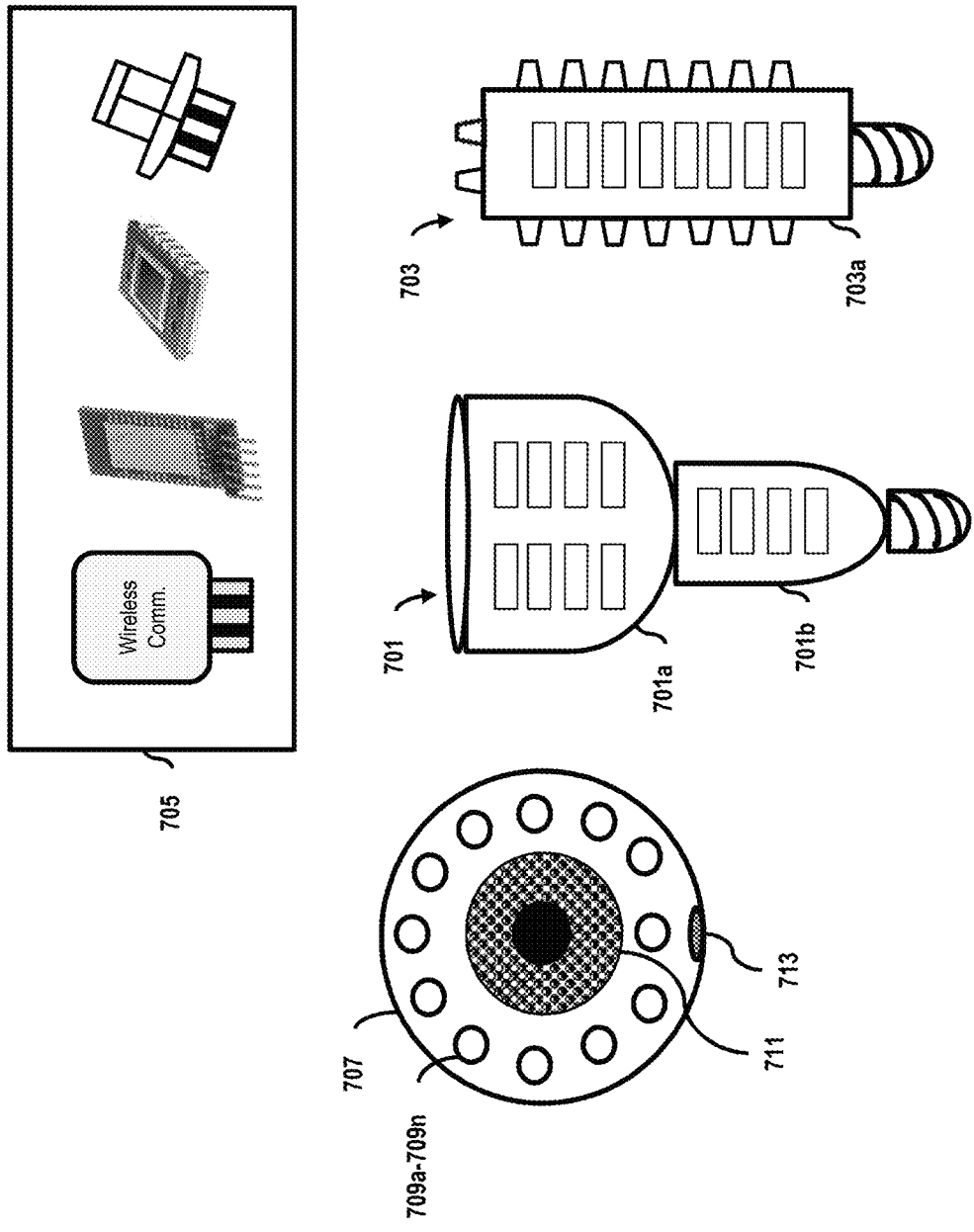
FIG. 7A includes example diagrams of modular smart illumination devices and various example modules, according to various embodiments.

FIG. 7A includes example diagrams of modular smart illumination devices and various example modules, according to various embodiments. In various embodiments, illumination devices may be available in different form factors and sizes such as examples 701 and 703, which may be utilized in different fixtures or for different purposes. Further, an illumination device may include various configuration ports for accepting one or more modules. For example, the illumination device 701 includes a plurality of ports depicted in sections 701a and 701b of the illumination device 701, and the illumination device 703 includes a plurality of ports depicted in section 703b. For example, one or more ports at the illumination devices 701 or 703 may be configured with one or more modules depicted in the example modules 705, which may include a wireless communication module, a networking module, a motion sensor module, a remote control module, or the like. Diagram 707 depicts a top view of the illumination device 701 that includes a plurality of LEDs 709a-709n, a loudspeaker 711, and a microphone 713. In various embodiments, one or more elements, components, or modules at an illumination device may interface with one or more modules. For example, the loudspeaker 711 and the microphone 713 may interface with an audio module, a video module, a communication module, or the like, which may provide functionalities according to the interfacing module.

FIG. 7B includes example use cases of a modular smart illumination device and various user devices to interface with, according to various embodiments. In various scenarios, illumination devices may be installed or utilized in different spatial areas; for example, in an office area 721, an exterior (e.g., pool, backyard, etc.) area 723, a kitchen area 725, a living area at a residence 727, or the like. In various embodiments, illumination devices may be configured to provide different functionalities that may be based on the spatial area or the purpose that an illumination device is to be used for. For example, an illumination device for use at or near a library area may not need to be configured with an audio module or a remote control module, whereas illumination devices in the kitchen area 725 may be configured with a plurality of modules; for example, a remote control module, an audio module, a motion sensor module, an audio relay module, or the like, so that a wide range of functions may be available to a user or a service provider. In various embodiments, an illumination device may interface and interact with a broad range of remote or local user devices for receiving or proving various services. Diagram 729 depicts as example devices a mobile phone, a tablet, a laptop computer, a TV set, a tablet, and a network router.

Figure 8A:
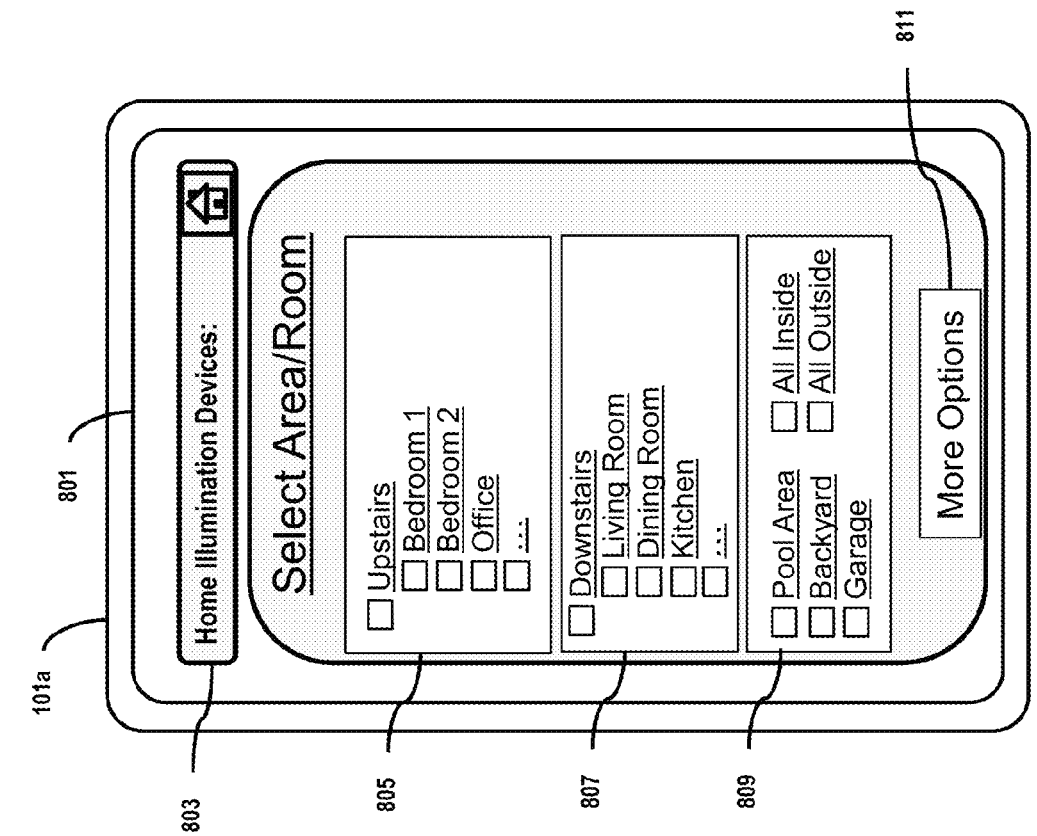
FIGS. 8A through 8C are diagrams of user interfaces for use in the processes of FIGS. 4 through 6, according to various embodiments.
Figure 8B:
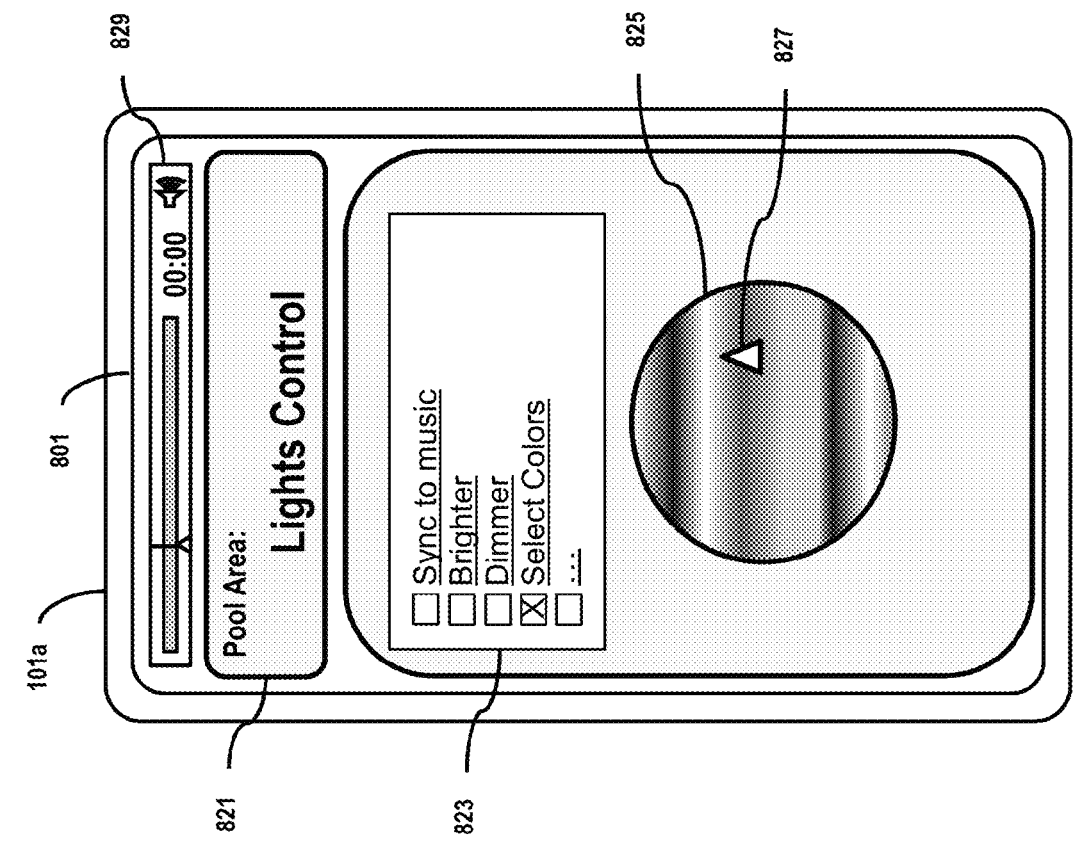
Figure 8C:
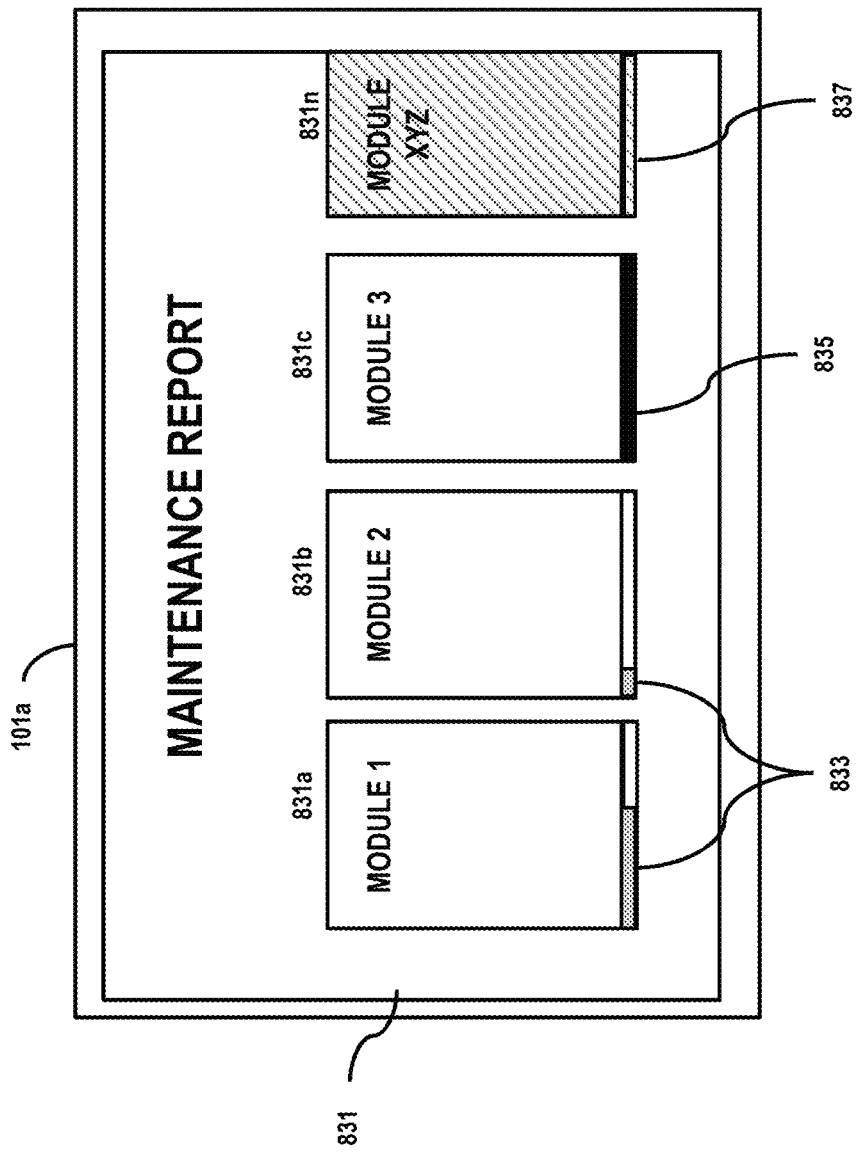

FIGS. 8A through 8C are diagrams of user interfaces for use in the processes of FIGS. 4 through 6, according to various embodiments.

FIG. 8A depicts a user device 101a showing a UI 801, which may be utilized to interface with various illumination devices. In one example, UI element 803 indicates that a user may interact with home illumination devices, wherein various UI elements 805, 807, 809, and 811 may be presented to the user. In one scenario, the user may select one or more options presented in 805, 807, or 809; for example, to interact with the illumination devices available at an "upstairs" area of a residence, or the user may select from individual spatial areas "Bedroom 1," "Bedroom 2," "Office," or the like. In one embodiment, once the user selects a given spatial area, then a list of illumination devices associated with that spatial area may be presented to the user so that the user may choose to interact with and control functions of a particular illumination device, wherein an illumination device may be addressed based on an ID number, name, location, group, or the like. Similarly, a user may select one or more options in 807 or 809 to interface with illumination devices in a given spatial area. Additionally, a user may select 811 to for additional options associated with the user, the user device, a service provider, one or more spatial areas, or the like.

In FIG. 8B, the UI 801 at the user device 101a indicates at 821 that a user has elected to interface and control the lights, i.e., illumination devices, in the pool area, wherein the UI presents various options at 823. In this example, a user has chosen to "Select Colors" of illumination elements at the illumination devices in the pool area. Further, the chosen option presents additional UI element 825; for example, a visual color disk, which the user may utilize to vary the color 827 of the illumination elements as one or more illumination devices. In one embodiment, the UI application, may determine and indicate, at 829, that a media item is in a playback mode at the user device 101a, which may cause a presentation of an option "Sync to music" in the options 823. For example, the user may select to synchronize the illumination elements/devices to the music being played back at the user device 101. In one example, the user may also be presented with an option to stream the music to one or more illumination devices for playback.

In FIG. 8C, UI 831 at the user device 101a indicates status or maintenance information associated with available modules 831a-831n. In one embodiment, the maintenance information may be shown as visual indicators. For example, indicator 833 may indicate usage (e.g., time) at the associated modules 831a and 831b, indicator 835 indicating that module 831c is not functioning or needs to be replaced soon. Further, configuration ports that are not yet configured with a module, e.g., port XYZ for 831n, may still be shown with an indicator 837 in the report.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The exemplary techniques and systems presented herein enable a modular smart illumination device for receiving and providing various services. As an advantage, a modular smart illumination device may be configured with various modules for receiving and providing various services. Additionally, the methods of the system 100 may provide for various interface and interactions by a user device or a service provider with one or more local or remote illumination devices.

The processes described herein for facilitating a modular smart illumination device for receiving and providing various services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
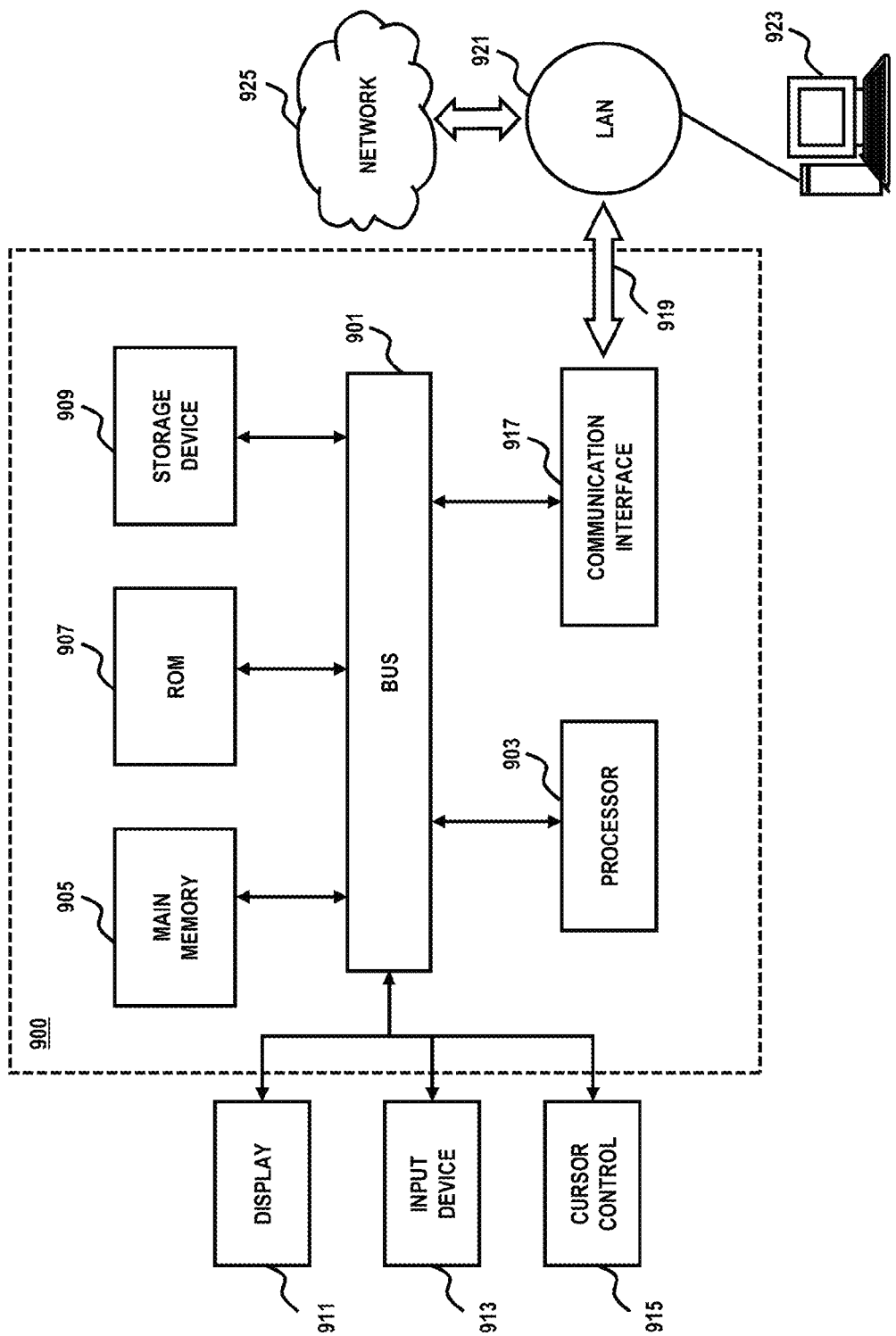
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc.

Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
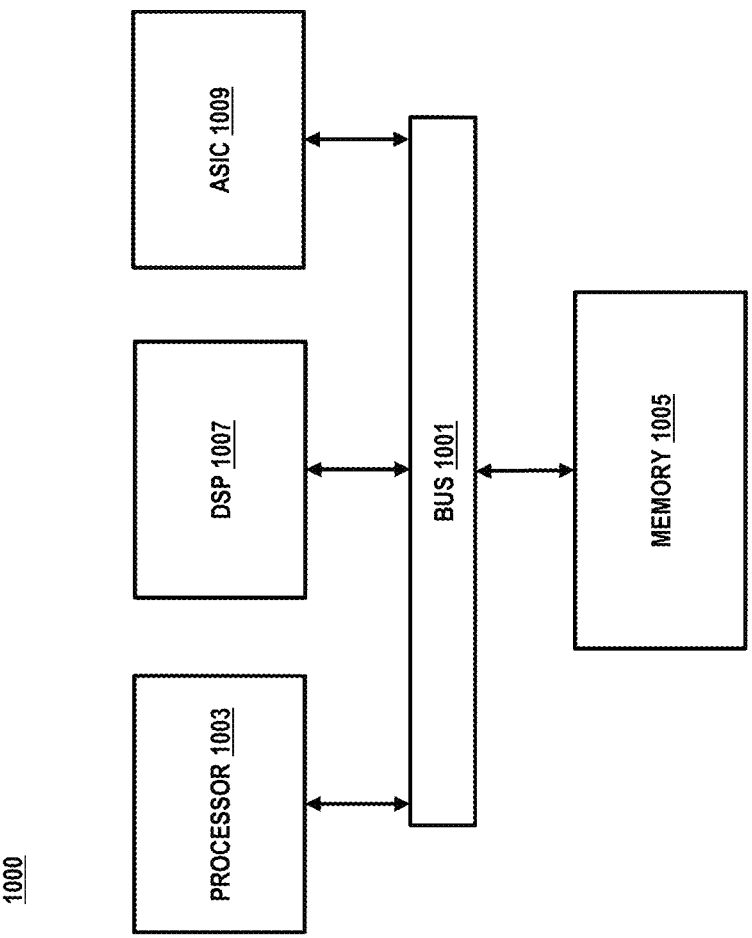
FIG. 10 is a diagram of a chip set that can be used to implement an embodiment of the invention.

FIG. 10 illustrates a chip set 1000 upon which an embodiment of the invention may be implemented. Chip set 1000 is programmed to provide for implementing a modular smart illumination device for receiving and providing various services and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 4-6.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method, implemented by an illumination device that includes a light bulb, a motion detection module, a network module, and a speaker, the method comprising:
   outputting, by the light bulb of the illumination device, light in a spatial area corresponding to a location in which the illumination device is affixed;
   detecting, by the motion detection module of the illumination device, a presence of a user in the spatial area;
   receiving, by the networking module of the illumination device and from a user device associated with the user, streaming audio;
   and
   outputting, by the speaker of the illumination device and based on detecting the presence of the user in the spatial area, the streaming audio received from the user device.

2. The method of claim 1, wherein the illumination device is associated with a peer illumination device in the same spatial area, the method further comprising:
   outputting, by the networking module, the streaming audio to the peer illumination device,
   wherein the peer illumination device outputs the streaming audio via a speaker associated with the peer illumination device.

3. The method of claim 2, the illumination device further includes at least a microphone, the method further comprising:
   providing a voice command function to control the peer illumination device based on voice commands from the user.

4. The method of claim 1, further comprising:
   providing, by the networking module, a network range extending function or a network access point function.

5. The method of claim 1, further comprising:
   providing a maintenance report associated with a plurality of modules of the illumination device or of the peer illumination device, the maintenance report indicating usage statistics associated with the plurality of modules.

6. The method of claim 1, further comprising:
   receiving a notification of an event;
   audibly outputting, based on detecting the presence of the user in the spatial area, a sound associated with the notification.

7. The method of claim 1, further comprising:
   detecting a change in a configuration of the plurality of modules of the illumination device or the peer illumination device; and
   updating a configuration of the illumination device or the peer illumination device in a local profile or a service provider profile associated with the illumination device or the peer illumination device.

8. The method of claim 1, further comprising:
   receiving, from the user device, an instruction for a remote device communicatively coupled to the illumination device; and
   relaying the instruction to the remote device.

9. An apparatus, comprising:
   a light bulb attachable to a fixture;
   a speaker;
   a motion detection module:
   a wireless communication transceiver; and
   a processor configured to control operation of the light bulb, the speaker, and the wireless communication transceiver, wherein when controlling the light bulb, the speaker, and the wireless communication transceiver, the processor is configured to:
      cause the light bulb to output light in a spatial area that corresponds to a location in which the apparatus is affixed;
      cause the motion detection module to detect a presence of a user in the spatial area;
      cause the wireless communication transceiver to receive streaming audio from a user device associated with the user; and
      cause, based on detecting the presence of the user in the spatial area, the speaker to output the streaming audio received from the user device.

10. The apparatus of claim 9, wherein the apparatus is communicatively coupled to a peer illumination device in the same spatial area, wherein the apparatus is further caused to:
    output, by the wireless communication transceiver, the streaming audio to the peer illumination device,
    wherein the peer illumination outputs the service streaming audio via a speaker associated with the peer illumination device.

11. The apparatus of claim 10, wherein the apparatus is further caused to:
    provide, by the wireless communication transceiver, a network range extending function or a network access point function.

12. The apparatus of claim 10, wherein the apparatus is further caused to:
    provide usage information associated with a plurality of modules of the illumination device or of the peer illumination device.

13. The apparatus of claim 10, further comprising:
    a microphone module,
    wherein the apparatus is further caused to:
       provide a voice command function to control the peer illumination device based on voice commands from the user.

14. The apparatus of claim 10, wherein the apparatus is further caused to:
    receive a notification of an event;
    audibly output, based on detecting the presence of the user in the spatial area, a sound associated with the notification.

15. The apparatus of claim 10, wherein the the apparatus is further caused to:
    receive, from the user device, an instruction for a remote device communicatively coupled to the apparatus; and
    relay the instruction to the remote device.

16. An apparatus, comprising:
    a light bulb attachable to a fixture;
    a microphone;
    a wireless communication transceiver; and
    a processor configured to control operation of the light bulb and the wireless communication transceiver, wherein when controlling the light bulb and the wireless communication transceiver, the processor is configured to:
       receive, via the wireless communication transceiver, a first instruction, from a user device, to output light from the light bulb,
       cause, based on the first instruction, the light bulb to output light in a spatial area in which the apparatus is affixed;
       output, based on the first instruction and via the wireless communication transceiver, a second instruction to one or more other lighting devices located in the spatial area, the second instruction causing the one or more other lighting devices to output light from respective light bulbs associated with the one or more other lighting devices;

receive a third instruction as a voice command via the microphone; and cause the light bulb to cease outputting light based on the third instruction.

17. The apparatus of claim 16, wherein the light bulb, the wireless communication transceiver, and the processor are integrated in a same physical device.

18. The apparatus of claim 16, wherein the light bulb is attachable to a fixture in the spatial area.

19. The apparatus of claim 16, wherein the apparatus is further caused to: output, based on receiving the third instruction, a fourth instruction, via the wireless communication transceiver, to the one or more other lighting devices, the fourth instruction causing the one or more other lighting devices to cease outputting light from the respective light bulbs associated with the one or more other lighting devices.

* * * * *